No. 848,119. PATENTED MAR. 26, 1907.
C. MINER.
APPARATUS FOR HULLING COTTON SEED.
APPLICATION FILED MAY 11, 1903.

2 SHEETS—SHEET 1.

Fig. 1.

Witnesses
Percy C. Bowen
P. W. Birkhead

Inventor
Charles Miner
By Howson & Howson
Attorneys

No. 848,119. PATENTED MAR. 26, 1907.
C. MINER.
APPARATUS FOR HULLING COTTON SEED.
APPLICATION FILED MAY 11, 1903.
2 SHEETS—SHEET 2.
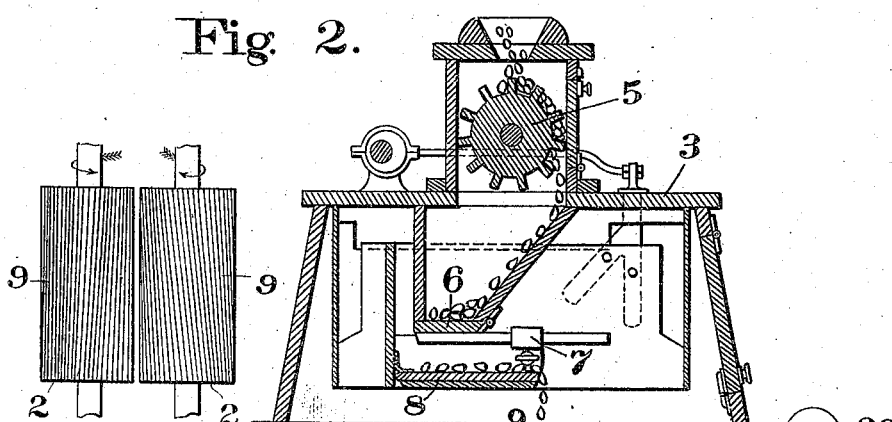
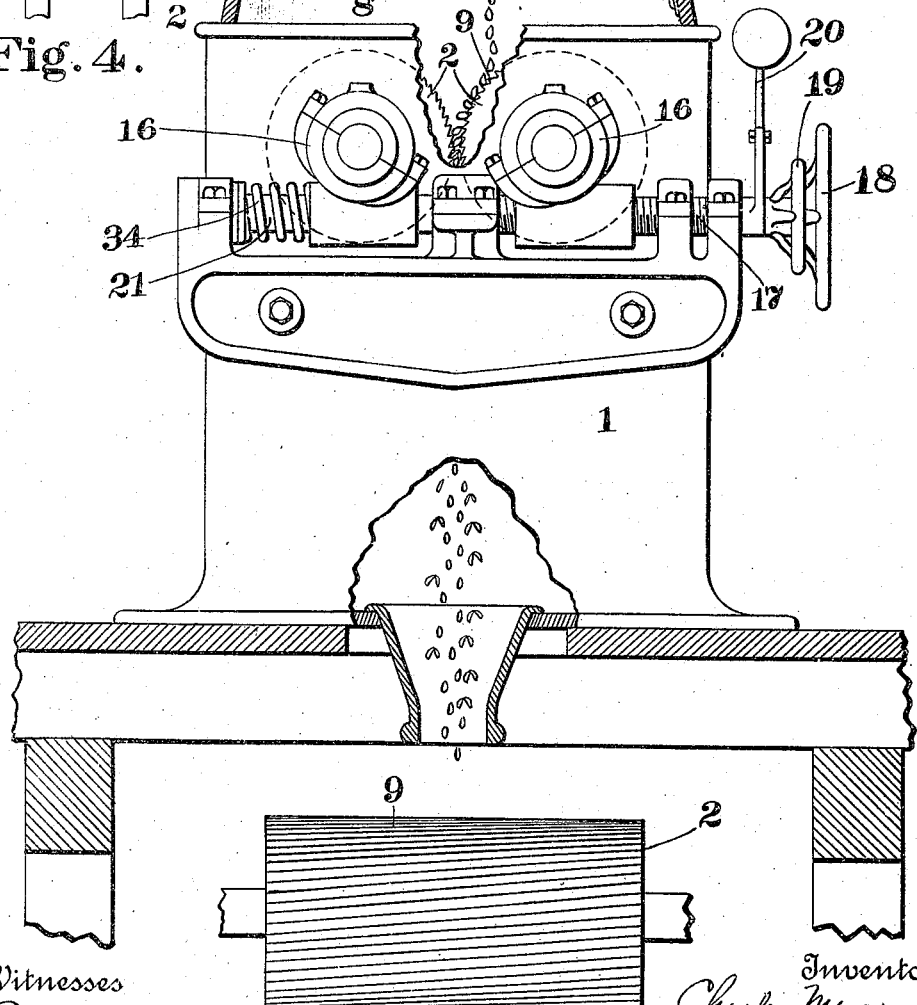

UNITED STATES PATENT OFFICE.

CHARLES MINER, OF CHESTER, SOUTH CAROLINA.

APPARATUS FOR HULLING COTTON-SEED.

No. 848,119.      Specification of Letters Patent.      Patented March 26, 1907.

Application filed May 11, 1903. Serial No. 156,581.

*To all whom it may concern:*

Be it known that I, CHARLES MINER, a citizen of the United States, residing at Chester, county of Chester, State of South Carolina, have invented certain new and useful Improvements in Apparatus for Hulling Cotton-Seed, of which the following is a specification.

My invention relates to apparatus for hulling cotton-seeds or like seeds for the purpose of preparing such seeds for the subsequent process of extracting the oil therefrom—such, for example, as that commonly carried out by the use of any of the well-known forms of oil-presses, wherein, after being reduced to the form of a meal, the seeds are properly heated and subjected to pressure while confined in cloths in said presses, through which cloths the oil filters and passes to a suitable receptacle, and the resulting cake of meal is removed from the cloths after such oil has been extracted.

Heretofore it has been the practice, and the only practice, so far as I am aware, to subject the seeds, preferably after they have been cleaned by any of the well-known processes, to the action of a hulling-machine, wherein a cylinder provided with projecting knives or ribs coöperating with stationary knives cuts and breaks the hulls from the seeds and the resulting stock conveyed to separating-machines in which the hulls have been separated from the meats, the latter being conveyed to the grinding-mill for reduction to a meal, and the former to the hull-house.

In the operation of such apparatus as that designated it has been found by long experience that from 2.5 tons to five tons of seeds are lost in every one hundred tons of seeds treated—that is, from two and one-half per cent. to five per cent. loss is entailed by the use of such apparatus. I have found that a large percentage of this loss is due, first, to the character of the hulling apparatus, and, second, to the separator, and this loss is directly due to the facts, first, that the action of the rotating knives or ribs in close proximity to the stationary knives is so violent and imposes such excessive pressure upon the seeds as to crush a large percentage of the meats or kernels into the hulls, and by such disintegration a considerable portion of the meats adhere to the hulls after the passage of the seeds through the hulling-machine, and, second, in the operation of the separating-machines instead of effectively detaching the adhering particles of meat from the broken hulls the action is so violent—such as, for example, in the common form of beaters and shakers used—as to not only further increase the objectionable defect above noted, but also carry away to a considerable extent the cuticle covering the kernel or meat and containing the ammonia compound, which it is required to retain at a legal standard in the resulting meal, such ammonia compound being lost not only in the meats adhering to the broken hulls, but during violent agitation or shaking to which the stock has been subjected in the separator.

I have found that by carrying out both steps of the hulling and separation in a more gentle manner and in such a way as to detach the meats from the hulls without crushing the same the percentage of loss is so materially reduced as to effect a very large economy in the manufacture of cotton-seed oil, the valuable product desired, as well as in the power required to reduce a given amount of stock to the desired condition, and I have described and claimed such process in my application for a patent filed concurrently herewith.

It is the purpose of my present invention to provide an effective apparatus for carrying out my novel process of hulling cotton-seeds and like seeds, whereby the material advantages derived by the practice of my new process may be secured.

With this object in view my invention consists in the novel construction of apparatus and in the novel combination of parts hereinafter described with reference to the accompanying drawings and more particularly pointed out in the claims.

In the drawings, Figure 1 is a side elevation of the apparatus embodying my invention, partly in section. Fig. 2 is an enlarged view in elevation with parts broken away, showing one of the roll structures. Fig. 3 is a side view of one of the rolls; and Fig. 4 is a plan of a pair of hulling-rolls, illustrating the relative positions of their respective corrugations.

Referring to the drawings, in which the same reference characters relate to the same or corresponding parts in all the views, the numeral 1 indicates casings, in each of which is journaled a pair of corrugated hulling-rolls 2, such as are shown in Fig. 4, driven in opposite directions toward each other by any suitable driving means not deemed necessary to show in detail, but indicated as a belt-drive, with open and crossed belts driven from a suitable shaft 22. These rolls are preferably driven at differential speeds, the first pair preferably driven at a differential of one and one-half to one, the next pair at two to one, and the third at two and one-half to one, though this differential is not to be taken as limiting my invention, since it depends upon the character of the stock under treatment and is determined by the operator. Any suitable differential drive may be used—as, for example, pulleys 23 and 24 on the respective roll-shafts driven by belts 25 and 26 from the shaft 22—and of course any suitable belt-tightening devices may be used.

The first pair of rolls is adapted to receive the cotton-seeds discharged from a suitable regulated feed-hopper 3, the latter of which receives the seeds from a source of supply by an elevator or conveyer discharging into a spout 4, which delivers the stock into the hopper onto the measuring-roll 5, by which it is periodically discharged onto the weighted feed-valve 6, and when the load overbalances the weight 7 it is dumped upon a shaking-table 8 and then spread in the usual manner in a thin stream and flows from the edge of the table, falling between the rolls 2. This form of feed I have found to be a convenient and desirable one; but any suitable regulated feed may be employed, as this feature forms no part of my present invention, which relates to the hulling-rolls and separating devices and combination between such parts. The rolls 2 are so adjusted that the clearance between the hull-engaging surfaces of said rolls—that is, the ribs or corrugations—shall be sufficiently great to engage the seeds by frictional contact upon the hulls with such comparatively light pressure as to avoid crushing the meats or kernels, while sufficient to rend or break the hulls. The corrugations 9 on the rolls are inclined or spirally disposed around the rolls at a suitable angle—such, for example, as that derived from an inclination of about one-half inch to a foot—whereby when the seeds fall into contact with said corrugations there is a tendency to divert the same from the vertical downward path of the motion, and thus impart a twisting strain upon the hulls in frictional contact with the rolls, and as the rolls rotate at differential speeds the slower roll tends to drag that side of the hull in contact therewith, as the faster roll tends to pull the other side, thereby imparting a twisting strain to the hull.

Located under each of the hulling-rolls is a separator 10, the inlet of which is connected to the outlet of its corresponding hulling-rolls by a stocking 11, through which the detached meats and hulls fall into said separator. From the outlet for the tailings of the first separator an elevator or conveyer 12 is adapted to carry the tailings to a spout 27, discharging into the hopper 3 of the next set of rolls, and the meats from such separator are carried by a suitable conveyer 13 to an elevator-boot 28, thence by an elevator 29, discharging through a spout 32 into a grinding-mill 14, in which the meats are reduced to meal, and from this mill a suitable conveyer or a pipe 15 is adapted to carry the meal to the heater 30, wherein the meal is heated to the proper temperature, and thence it is carried by suitable means, such as a conveyer 31, to the place for filling the filtering-cloths in the usual way.

Each of the separators is of the same construction, and preferably of the type known as "gyrators," an efficient form of said separator being that shown in the patent of August Wolf, No. 595,585. By the use of this form of separator I have found that the proper gentle separating action in which the stock is subjected to a gyratory motion on a plane surface can be secured wherein the greatest amount of meats and ammonia compound can be retained in the finished product conveyed to the grinding-mill; but it is to be understood that my invention is not limited to any particular form of separator, the only requisite being that it shall be of such type as will produce a gentle separation, as distinguished from a separation in which considerable force is utilized, the object being to prevent any detrimental action upon the cuticle containing the ammonia compound, as well as to prevent the violent action upon the partially-broken hulls containing adhering meats.

From each separator an elevator 12 or other suitable conveyer is adapted to convey the tailings to the next succeeding pair of rolls, and from the final set of rolls a suitable conveyer 33 is provided for conveying the hulls to the hull-house, and from the finished product-outlets of each separator a conveyer 13 is arranged to carry the stock to the grinding-mill 14.

I have found that an efficient clearance between the first set of rolls is about three-sixteenths of an inch, and that this clearance should decrease between the successive pairs of rolls in order that such seeds and partially-broken hulls as may have passed through the preceding separator may be properly subjected to the same action as that occurring in the first set of rolls. Likewise, I find that it is desirable that the differential speeds above indicated should increase with the succeeding set of rolls. The fineness of the corrugations should increase in the same order.

In practice I have found that in the first set of rolls good results can be obtained with rolls having about five corrugations to the inch, and in the second set six corrugations to the inch, and in the third set eight corrugations to the inch; but neither the specified differential speeds nor this fineness is to be taken as limiting my invention, since each depends upon the character of the stock and other conditions under control of the operator, and in a similar manner the clearance between the several pairs of rolls depends upon the character of the stock and such conditions as are governed by the operator.

For adjustment of the rolls to vary the clearance, as conditions warrant, I employ any suitable form of adjusting means—such as that shown, for example, in Fig. 2, where the bearing 16 for one roll, the right-hand roll in this instance, is mounted upon a a screw 17, which is operated by a suitable hand-wheel 18, provided with a locking-wheel 19 for locking the same in any adjusted position, and also preferably provided with a weighted throwing-out arm 20, which is adapted to turn the screw 17 when thrown for the purpose of drawing said roll away from its mate in emergency or when desired to open the machine for repairs.

It is also desirable to provide a safety device to permit the free passage between the rolls of any hard substances—such as stones, gravel, or broken pieces of iron—frequently mixed with the seeds and escaping the cleaners, so as to avoid damage or breakage of any of the parts, and to effect this I use a simple form of device consisting of helical spring 34 and rod 21, upon which is mounted the normally stationary roll 2 in its bearing 16. The spring is set for such tension as will quickly yield to a greater pressure than that required to tear or rip the hull from the cotton-seeds, thus affording free passage of any foreign substance through the rolls without injury to the same.

I claim as my invention—

1. In a cotton-seed-hulling apparatus, the combination of rolls rotating at differential speeds in opposite directions and provided with spirally-disposed corrugations constituting hull-engaging surfaces adapted to engage the hulls of seeds passing between the rolls and exert thereon a twisting action of light pressure sufficient to rend the hulls, means for rotating said rolls at differential speeds in opposite directions and a separator connected therewith adapted to subject the stock from said rolls, to a separating action, and a second set of spirally-corrugated rolls rotating at differential speeds in the opposite directions adapted to act upon the tailings from said separator, means for rotating said second set of rolls at differential speeds in opposite directions, substantially as described.

2. In a cotton-seed-hulling apparatus, the combination of rolls rotating at differential speeds in opposite directions and provided with spirally-disposed corrugations constituting hull-engaging surfaces adapted to engage the hulls of seeds passing between the rolls and exert thereon a twisting action of light pressure sufficient to rend the hulls, means for rotating said rolls at differential speeds in opposite directions and a separator connected therewith adapted to subject the stock from said rolls to a separating action, successive sets of spirally-corrugated rolls rotating at differential speeds in opposite directions adapted to act upon the tailings from the preceding separators, means for rotating said successive sets of rolls at differential speeds in opposite directions and successive separators following each set of rolls and adapted to subject the tailings from the preceding set of rolls to a gentle separation, substantially as described.

3. In a cotton-seed-hulling apparatus, the combination of rolls rotating at differential speeds in opposite directions and provided with spirally-disposed corrugations constituting hull-engaging surfaces adapted to engage the hulls of seeds passing between the rolls and exert thereon a twisting action of light pressure sufficient to rend the hulls, means for rotating said rolls at differential speeds in opposite directions and a separator connected therewith adapted to subject the stock from said rolls to a separating action, and a second set of spirally-corrugating rolls having less clearance than the first set and rotating at increased differential speeds in opposite directions, and means for rotating said second set of rolls at differential speeds in opposite directions substantially as described.

4. In a cotton-seed-hulling apparatus, the combination of rolls rotating at differential speeds in opposite directions and provided with spirally-disposed corrugations constituting hull-engaging surfaces adapted to engage the hulls of seeds passing between the rolls and exert thereon a twisting action of light pressure sufficient to rend the hulls, means for rotating said rolls at differential speeds in opposite directions and a separator connected therewith adapted to subject the stock from said rolls to a separating action, and a second set of rolls of greater fineness of corrugations than the first set adapted to act upon the tailings from the said separator in a similar manner, and means for rotating said second set of rolls at differential speeds in opposite directions substantially as described.

5. In a cotton-seed-hulling apparatus, the combination of rolls provided with spirally-disposed corrugations constituting hull-engaging surfaces adapted to engage the hulls of seeds passing between the rolls and exert thereon a twisting action of light pressure to rend the hulls, means for rotating said rolls at differential speeds in opposite directions, and a separator connected therewith adapted to subject the stock from said rolls to a separating action, and a second set of rolls of greater fineness, less clearance, and greater differential speeds than the first set, substantially as described.

6. In a cotton-seed-hulling apparatus, the combination of rolls provided with spirally-disposed corrugations constituting hull-engaging surfaces adapted to engage the hulls of seeds passing between the rolls and exert thereon a twisting action of light pressure to rend the hulls, means for rotating said rolls at differential speeds in opposite directions, and a separator connected therewith adapted to subject the stock from said rolls to a separating action, and successive sets of rolls of increasing fineness and differential speeds and decreasing clearance, and separators cooperating with each set of rolls adapted to subject the stock from the preceding set of rolls to a separating action and to discharge the tailings to the next set of rolls, substantially as described.

7. In an apparatus for hulling cotton-seeds the combination of successive pairs of spirally-corrugated rolls with gradually-decreasing clearances, increasing fineness and rotating at gradually-increasing differential speeds, and separators in series with said rolls, each arranged to receive the stock from the preceding rolls and subject it to a gentle separating action, means for rotating said sets of rolls in opposite directions at differential speeds and means for conveying the tailings from the last separator of the series to a suitable place of deposit, substantially as described.

8. A system of apparatus for hulling cotton-seeds comprising a series of machines each consisting of a pair of corrugated hulling-rolls and a separator, a grinding-mill, conveying means placed to receive meats from each separator and deliver the same to the grinding-mill, and a conveyer for each separator placed to deliver the hulls therefrom to the hulling-rolls of the next succeeding machine, with a third conveyer placed to remove the hulls from the last of the separators, the hulling-rolls of succeeding machines being adjusted so that each pair of rolls is of less distance apart than the pair of the machine preceding it, substantially as described.

In testimony whereof I have signed my name to this specification in the presence of two subscribing witnesses.

CHARLES MINER.

Witnesses:
C. W. FOWLER,
M. H. MILES.